United States Patent [19]
Massey

[11] 4,215,380
[45] Jul. 29, 1980

[54] CARRIERS FOR MOUNTING LIGHTNING PROTECTORS

[75] Inventor: Alan W. Massey, Radlett, England

[73] Assignee: Post Office, London, England

[21] Appl. No.: 830,018

[22] Filed: Aug. 30, 1977

[30] Foreign Application Priority Data

Sep. 1, 1976 [GB] United Kingdom ............... 36183/76

[51] Int. Cl.[2] .............................................. H02H 3/22

[52] U.S. Cl. ...................................... 361/119; 361/117; 339/111; 339/198 S

[58] Field of Search ................ 361/117, 118, 119, 120, 361/352, 394, 331, 414, 422, 400, 401, 399; 339/111, 198 R, 198 E, 198 G, 198 H, 198 J, 198 S, 198 P, 214 S, 75 MP, 176 MP

[56] References Cited

U.S. PATENT DOCUMENTS

| | | | |
|---|---|---|---|
| 3,086,074 | 4/1963 | Just et al. | 339/198 S X |
| 3,173,062 | 3/1965 | Smith et al. | 339/198 P X |
| 3,917,982 | 11/1975 | George et al. | 361/120 X |
| 3,947,729 | 3/1976 | Tesch | 361/120 X |
| 3,961,226 | 6/1976 | Hoffman et al. | 361/120 X |
| 4,071,876 | 1/1978 | Benson et al. | 361/120 X |

*Primary Examiner*—Patrick R. Salce
*Attorney, Agent, or Firm*—Mason, Fenwick & Lawrence

[57] ABSTRACT

A lightning protector carrier comprises a lamellar element made of electrically insulating material and having a plurality of sets of holes therethrough each set of holes defining a respective socket to receive a respective lightning protector device, and a plurality of electrically conducting terminals for making electrical connection to lightning protector devices at a front face of the element. One hole of each set of holes accomodates a terminal and the terminals are electrically interconnected by one or more busbars at the rear of the element. At least the front surface of the element is shaped such that one hole of each set is separated from another hole of the set by a protruding portion of the element interposed between said one hole and said another hole.

18 Claims, 12 Drawing Figures

CARRIERS FOR MOUNTING LIGHTNING PROTECTORS

This invention relates to carriers for mounting lightning protector elements. The invention is particularly, but not exclusively, concerned with a lightning protector carrier suitable for mounting on a cable terminating unit.

In the past it was once the practice to protect telephone exchange equipment against lightning surges by the provision of carbon block lightning protection devices connected at the exchange to all incoming telephone lines. Such devices provided effective lightning protection but it was found that the additional expense involved in the provision of such protection was not justifiable in view of the small chance of damage to the exchange equipment. Consequently this lightning protection was abolished. Since that time exchange equipment has changed in design and with the advent of electronic exchange equipment, which is more susceptible to damage from lightning surges, it has again become advantageous to provide lightning protection for the exchange equipment, particularly in rural areas where there are a higher proportion of overhead lines. However during this interval, the density of terminations of subscribers' lines at an exchange has become much higher so that protecting each line with carbon block lightning protectors mounted on a carrier of the earlier design occupies a prohibitive space thus severely reducing the benefits derived from the more modern space saving terminating equipment.

It is an object of the invention to provide an improved lightning protector carrier.

According to the invention a lightning protector carrier comprises a lamellar element made of electrically insulating material and having a plurality of sets of holes therethrough, each set of holes defining a respective socket to receive a respective lightning protector device, and a plurality of electrically conducting terminals for making electrical connection to lightning protector devices at a front face of the element, one hole of each set of holes accomodating a terminal, the terminals being electrically interconnected by one or more busbars at the rear of the element.

According to another aspect of the invention an element for a lightning protector carrier is made of electrically insulating material, is of generally lamellar form and has a plurality of sets of holes therethrough, each set of holes defining a respective socket to receive a respective lightning protector device, at least a first surface of the element being shaped such that one hole of each set is separated from another hole of the set by a protruding portion of the element interposed between said one hole and said another hole.

Each protruding portion may comprise an annular protruding lip around said one hole.

Alternatively, each protruding portion may comprise a rib transverse to an intersecting a line joining said one hole to said another hole. The ribs may be arranged in a latticework configuration.

The element may have further protruding portions on said at least one surface interposed between adjacent sockets. The further protruding portions may comprise a latticework of ribs. The further protruding portions may protrude more than the first mentioned protruding portions.

The sockets may be arranged on the element in an array comprising a plurality of rows and columns.

Said at least a first surface may comprise first and second opposing surfaces.

Alternatively said at least a first surface may comprise a front surface of the element and the rear surface of the element may have a plurality of integral collars extending rearwardly therefrom around at least one hole of each set of holes. A collar may be provided around each hole.

Each socket may comprise three holes.

According to another aspect of the invention a lightning protector carrier comprises an element as defined above and a plurality of electrically conducting terminals located in respective holes for making electrical connection to lightning protector devices at the first front face of the element and for making electrical connection to conductors at the rear face of the element.

A plurality of terminals located in holes of respective sockets may be electrically interconnected. The electrical interconnection may comprise a conductor secured to the element.

The lightning protector carrier may further include a plurality of lightning protector devices, which may be gas discharge tubes, mounted in respective sockets of the carrier.

According to another aspect of the invention a lightning protector holder comprises a box and a lightning protector carrier as defined above mounted within the box.

The lightning protector holder may be mounted on a cable terminating unit having a plurality of conductor pair terminations. A plurality of pairs of connecting wires may be provided, each pair connecting a respective conductor pair to terminals in two holes of a respective socket.

By way of example only, certain illustrative embodiments of the invention will now be described with reference to the accompanying drawings, of which:

Figure 1:
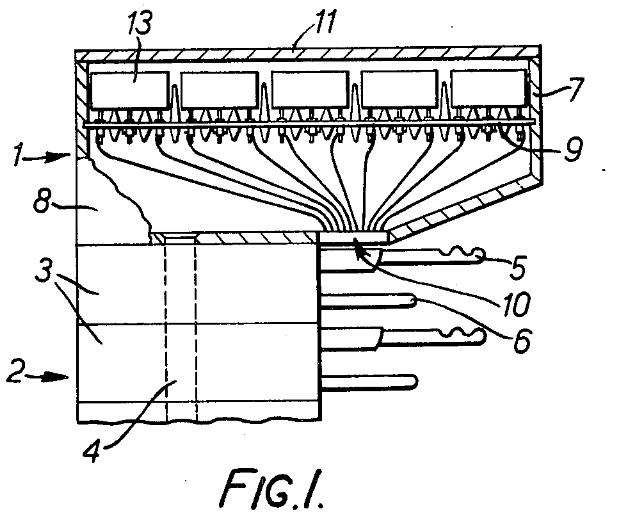
FIG. 1 is an end view of a lightning protector holder mounted on a cable terminating unit, the end of the holder being cut away to show the interior of the holder.

Referring to FIG. 1, a lightning protector holder 1 is shown fixed to a cable terminating and testing unit 2. The construction of the terminating and testing unit 2 is described in detail in the complete specification of co-pending British patent application No. 10366/75. The unit 2 comprises a plurality of elements 3 fixed together by three bolts 4; each element comprises a strip of electrically-insulating material one end of which is seen in FIG. 1, and a plurality of pairs of conducting members 5 and 6. One such pair of each element can be seen in FIG. 1, the remaining pairs lying behind the pair shown and thus being concealed.

Figure 3:
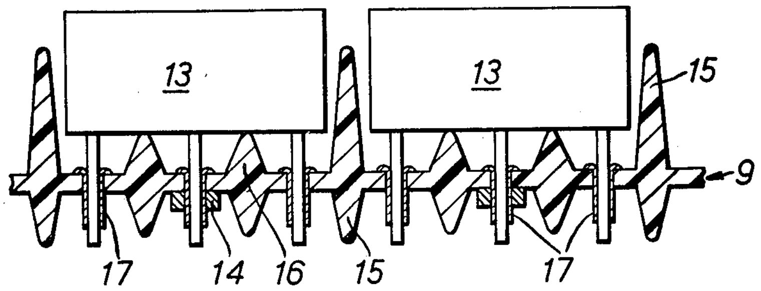
FIG. 3 is an enlarged sectional view along the lines III—III shown in FIG. 2.
Figure 2:
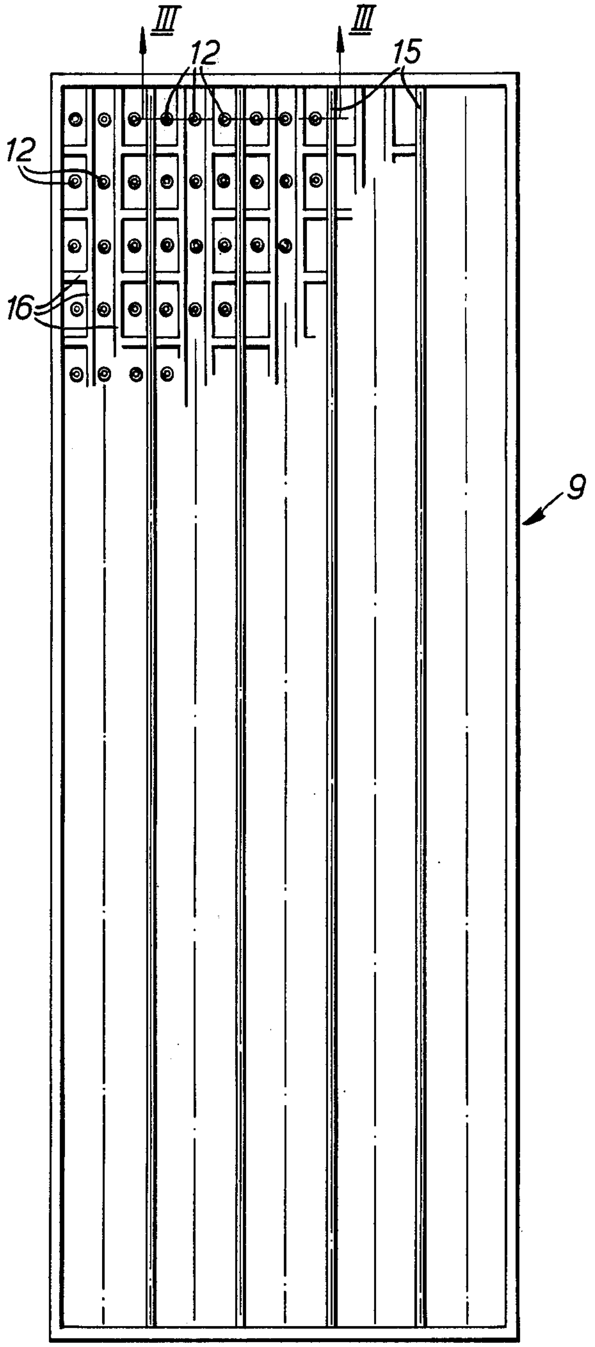
FIG. 2 is a plan view of a part of the lightning protector holder.

Referring to FIGS. 1 to 3, the lightning protector holder 1 comprises an elongate box housing a carrier element 9 and having sides 7, end faces 8, and a detachable lid 11. The side 7 which abuts the elements 3 of the terminating and testing unit 2 is provided with a series of holes 10 arranged in a row along the holder 1 and the unit 2.

The carrier element 9, of lamellar form and made of moulded electrically-insulating material, is clipped to the walls of the box and is provided with an array of three pin sockets 12 formed by terminals 17 located in holes in the element 9. The sockets 12 are arranged in twenty rows of which only the top few rows are seen in FIG. 2, each row consisting of five sockets and being aligned with a respective associated hole 10. Each socket 12 receives a three pin gas discharge tube 13; these discharge tubes are not shown in FIG. 2 for the sake of clarity. The centre terminal 17 of each socket 12 is electrically connected to a busbar at the rear of the carrier element 9. The busbars 14 are fixed to the carrier element 9 and run longitudinally along the plate. Thus each column of sockets 12 is provided with one respective busbar 14. Each of the busbars 14 is electrically connected to the bolts 4 which in turn are electrically connected to earth.

The carrier element 9 is provided on both faces with a latticework of ribs protruding on both sides of the plate. There are two sets of ribs: a first set 15 which run only longitudinally and separate adjacent gas discharge tubes, and a second set 16 which are shallower than the set 15 and run between pins of the discharge tubes to provide an increased track length between adjacent pins to guard against breakdown under voltage differences less than a predetermined value.

No ribs are provided between adjacent central terminals of sockets in adjacent rows since these terminals are all earthed. The latticework arrangement of the ribs is shown only at the top left of FIG. 2 but extends along the whole length and across the whole width of the plate 9. The pattern of the ribs on one side only of the plate is shown, the pattern on the other side being identical, but the depth of the ribs being different (as shown in FIG. 3).

In use, the lightning protector holder 1 is mounted in position on the terminating and testing unit 2 by means of the bolts 4. Conductors of a cable are led from the end of the unit 2 opposite the lightning protector holder 1 to the conducting members 5 and 6. The individual conductors constituting a subscribers pair are terminated at adjacent pairs of conducting members. Further wires are connected to the conducting members 5 and led along channels formed in the rear face of the unit 2. Each hole 10 in a wall 7 of the lightning protector holder 1 is aligned with a respective channel of the unit 2 and the wires in each channel are led through a respective hole 10 to the associated row of sockets 12. Each pair of wires connected via the unit 2 to a subscriber's conductor pair is terminated at a respective socket, one of the wires of the pair being connected to the left hand pin and the other to the right hand pin of a gas discharge tube 13. In FIG. 1 the wires are shown only in the holder 1.

The left hand pin and right hand pin of the tube are connected to respective electrodes in the discharge tube and equally spaced from the earthed electrode which is connected to the central pin. In the particular embodiment described the terminating unit comprises a sandwich of ten elements each element having twenty pairs of conducting members 5, 6. Each row of sockets 12 receives ten wires (one from each element) and twenty rows of sockets are provided on the plate 9.

The ribs 16 lengthen the track length between any two socket pins to a minimum of 4 mm; this track length prevents a voltage of less than 4 k V between adjacent pins causing breakdown of the protector. The ribs 15 prevent any possibility of contact between pins of adjacent gas discharge tubes.

Figure 4:
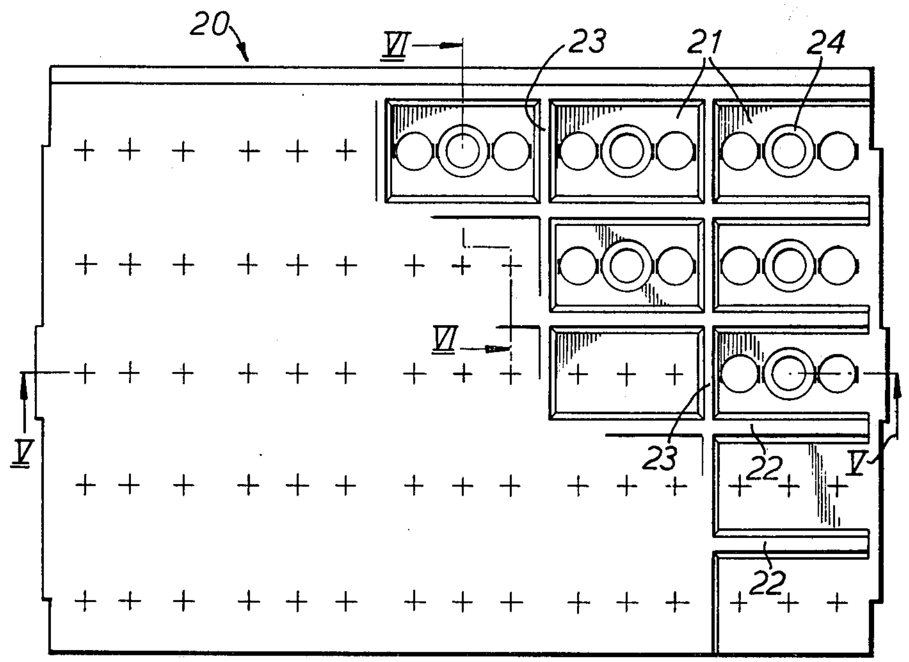
FIG. 4 is an enlarged plan view of a modified form of the part of the lightning protector holder shown in FIG. 2.
Figure 5:
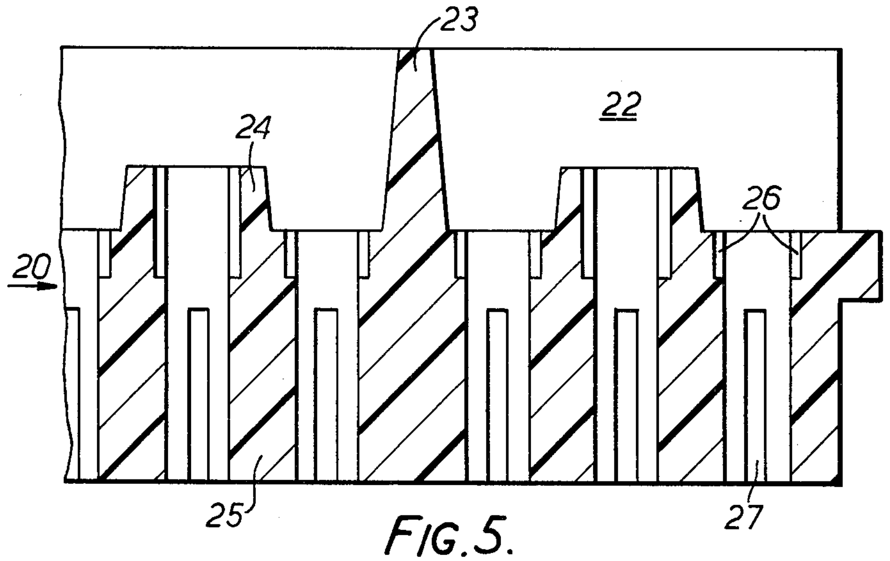
FIG. 5 is an enlarged sectional view along the lines V—V shown in FIG. 4.
Figure 6:
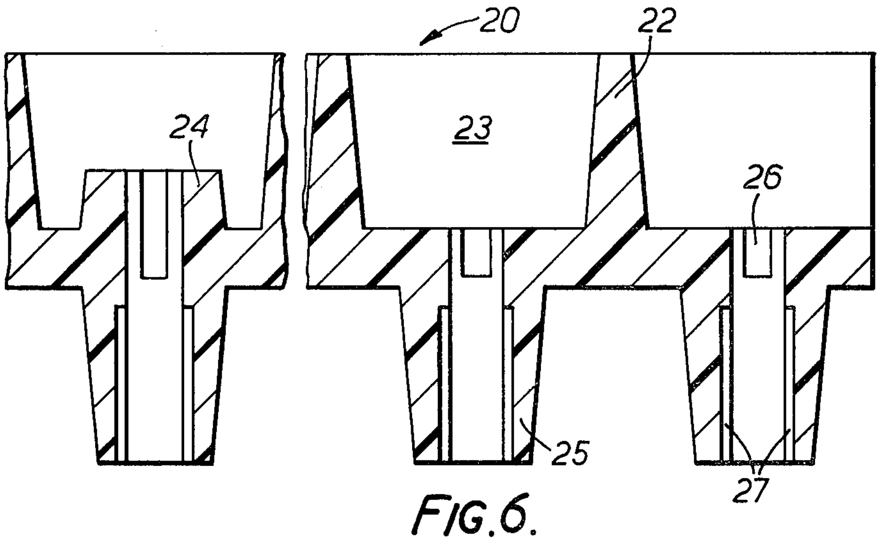
FIG. 6 is an enlarged sectional view along the lines VI—VI shown in FIG. 4.

FIGS. 4 to 6 show a modified form of the carrier element 9 previously described. In FIG. 4, the modified carrier element 20 has five rows of three pin sockets 21, each row comprising five sockets. A latticework of deep ribs, comprising ribs 22 separating sockets of adjacent rows and ribs 23 separating sockets of adjacent columns are provided on the front face of the element. Respective holes of each socket are separated by an annular protruding lip 24 around the central hole of the socket.

The rear face of the element is provided with five integral elongate collars 25, each collar surrounding all the sockets in a respective row. The extended socket holes defined by the collars 25 have a generally tubular bore with pairs of grooves 26 at the front ends thereof and pairs of grooves 27 at the rear ends thereof. These grooves are provided to secure terminals 30 (not shown in FIGS. 4 to 6) inserted into the socket holes from the rear.

Figure 7:
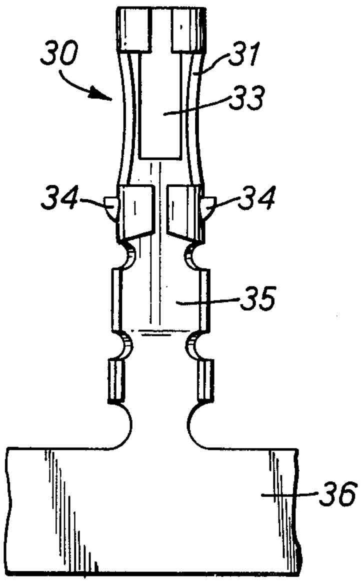
FIG. 7 is an enlarged plan view of a terminal which may be located in the part shown in FIGS. 4 to 6.
Figure 8:
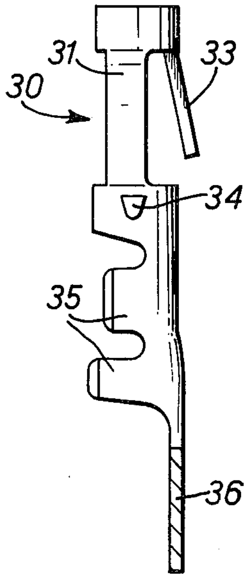
FIG. 8 is a side view of the terminal.
Figure 9:
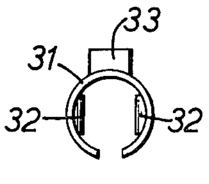
FIG. 9 is an end view of a part of the terminal.

One terminal 30 is shown in FIGS. 7 to 9. The terminal is made of metal and comprises a jaw portion 31 having opposing contacts 32 for contacting the pin of a discharge tube and from which a resilient tongue 33 extends, a central portion with a pair of projections 34, a crimp portion 35 and a busbar 36. The terminal 30 is sized such that it can be pushed into a socket hole of the element 20 from the rear with an orientation such that the tongue 33 engages one of the grooves 26 and the projections 34 engage respective grooves 27. It will be understood that the terminal is secured in the socket since rearward movement of the terminal is prevented by the tongue 33 engaging the rear end of one of the grooves 26 and forward movement of the terminal is prevented by the projections 34 engaging the forward ends of the grooves 27.

Each socket hole receives a respective terminal 30. The terminals in the end holes of each socket are modified from the form shown in FIGS. 7 to 9 in that they do not include a busbar 36. The terminals in the central holes of each socket are as shown in FIGS. 7 to 9 and terminals located in a common column are integrally connected by a busbar 36 which is connected to earth.

The carrier element 20 shown in FIGS. 4 to 6 is used in the same manner as the element 9 shown in FIGS. 1 to 3. The element 20 is mounted in a box as shown in FIG. 1 and three pin gas discharge tubes are inserted in respective sockets, the contacts 32 making electrical contact with the pins of the discharge tube. The end terminals in each socket are connected to respective wires of a subscriber's conductor pair by crimping the crimp portion 35 of each terminal to the respective wire. The gaps between adjacent collars 25 provide convenient passageways along which the wires may be lead. The annular lips 24 around the earthed terminals of the sockets again lengthen the track length between any two pins.

Figure 10:
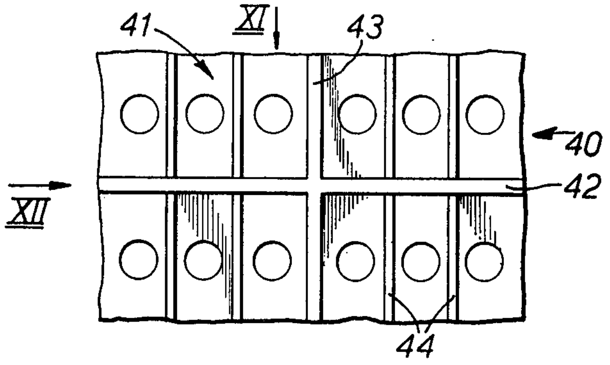
FIG. 10 is a plan view of another modified form of the part of the lightning protector holder shown in FIG. 2.
Figure 11:
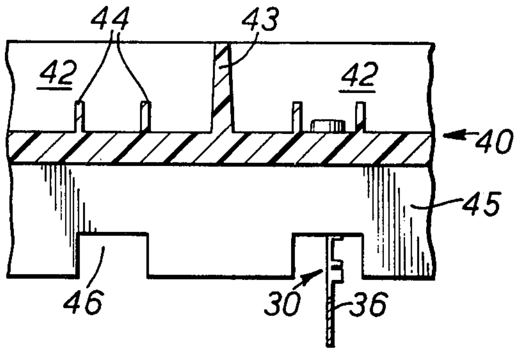
FIG. 11 is a sectional view in the direction of the arrow XI shown in FIG. 10.
Figure 12:
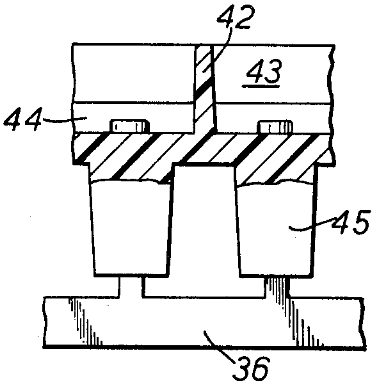
FIG. 12 is a sectional view in the direction of the arrow XII shown in FIG. 10.

FIGS. 10 to 12 show another modified form of carrier element 40 similar to the element 20. However in FIGS. 10 to 12 only a portion of the element comprising two rows and two columns of sockets 41 is shown. The front face of the element 40 has a latticework of deep ribs, comprising ribs 42 separating sockets of adjacent rows and ribs 43 separating sockets of adjacent columns. Respective holes of each socket are separated by shallower ribs 44 running parallel to the ribs 43 between adjacent holes of each socket. The ribs 44 replace the protruding lips 24 of the embodiment shown in FIGS. 4 to 6.

The rear face of the element 40 is generally similar to that of the element 20 and has rearwardly extending collars 45 which define bores having grooves (not shown) arranged as in the element 20 to secure terminals in the socket holes of the element 40. The collars 45 differ from the collars 25 in FIGS. 5 and 6 in that they are of reduced depth around each central hole of the socket, thus defining a series of channels 46 down the rear face of the element 40. FIGS. 11 and 12 show the element with one set of the earthing terminals 30 located in the element interconnected by the busbar 36.

The element 30 is used in the same manner as the element 20.

While various specific embodiments of the invention have been described, it will be apparent that many modifications may be made to the embodiment.

For example more than one carrier plate may be provided in the lightning protector holder 1. Additional carrier elements might be required for example if the number of conductor pairs terminating at the unit 2 were greater.

Features of one of the specifically described embodiments may be incorporated in another of the specifically described embodiments. For example the rear face of the carrier element 9 may be provided with collars extending rearwardly therefrom as is the rear face of the carrier element 20.

The size of the carrier elements may also be varied. For example the single element 9 having twenty rows of sockets may be replaced by four elements each having five rows of sockets.

The ribs and protruding lips may be replaced by some alternative protruding electrically insulating arrangement. For example, suitably placed conical protruberances may be provided to perform the same function as the ribs or lips.

Other forms lightning protector may be provided in place of gas discharge tubes. For example, carbon block protectors may be used.

In the embodiments described the lightning protector devices have three pins and each set of holes comprises three holes. This allows a single device to protect a pair of subscriber's lines. In other applications it may be preferable to protect only one conductor in which case the lightning protector device would have two pins and each set of holes comprise two holes.

The various forms of lightning protector holder described above are of simple and cheap construction. The various forms of carrier element described can readily be made by moulding of a plastics material. Furthermore the number of lightning protector devices which can be provided in the holder is very large for the size of the holder so that lightning protection can be provided for a large number of subscribers' lines in a small space.

I claim:

1. A lightning protector carrier comprising a lamellar element made of electrically-insulating material and having a plurality of sets of holes extending directly therethrough from a front face to a rear face of the element, a respective set of electrically-conducting terminals for each of said sets of holes, each terminal being accommodated in a respective one of the holes and extending therethrough from the front face to the rear face of the element whereby each set of terminals provides, at the front face of the element, a socket to receive a respective lightning protector device and, at the rear face of the element, means for making electrical connections from the socket to conductors, and at least one busbar interconnecting preselected ones of said terminals at the rear face of the element, at least one of the said faces of the element being formed with integral protruding portions interposed between said holes to separate the terminals of a set from each other.

2. A lightning protector carrier as claimed in claim 1 in which said busbar is secured to the rear face of the element.

3. A lightning protector carrier as claimed in claim 1 further including a plurality of lightning protector devices mounted in respective sockets of the carrier.

4. A lightning protector carrier as claimed in claim 3 in which the lightning protector devices are gas discharge tubes.

5. A lightning protector holder comprising a box and a lightning protector carrier as claimed in claim 1 mounted within the box.

6. A lightning protector holder as claimed in claim 5 in combination with a cable terminating unit having a plurality of conductor pair terminations.

7. A combination as claimed in claim 6 in which each set of holes in the element comprises three holes, and in which the terminals in two of the holes are connected to a respective one of the conductor pair terminations.

8. A carrier as claimed in claim 1 in which each protruding portion comprises an annular protruding lip around a hole.

9. A carrier as claimed in claim 1 in which each protruding portion comprises a rib transverse to and intersecting a line joining one hole to another hole.

10. A carrier as claimed in claim 9 in which the ribs are arranged in a latticework configuration.

11. A carrier as claimed in claim 1 in which the element has further integral protruding portions on said at least one face interposed between adjacent sockets.

12. A carrier as claimed in claim 11 in which the further protruding portions comprise a latticework of ribs.

13. A carrier as claimed in claim 11 in which the further protruding portions protrude more than the first mentioned protruding portions.

14. A carrier as claimed in claim 1 in which the sockets are arranged on the element in an array comprising a plurality of rows and columns.

15. A carrier as claimed in claim 1 in which said protruding portions extend from both the front and rear faces of the element.

16. A carrier as claimed in claim 1 in which said protruding portions comprise a plurality of integral collars extending outwardly from said front face and said rear face around at least one hole of each set of holes.

17. A carrier as claimed in claim 16 in which a collar is provided around each hole.

18. A carrier as claimed in claim 1 in which each socket comprises three holes.

* * * * *